April 21, 1964 C. D. VISOS 3,129,651
AUTOMATIC TOASTER
Filed Dec. 6, 1960 3 Sheets-Sheet 1

INVENTOR:
Charles D. Visos,
BY
Bair, Freeman & Molinare
ATTORNEYS.

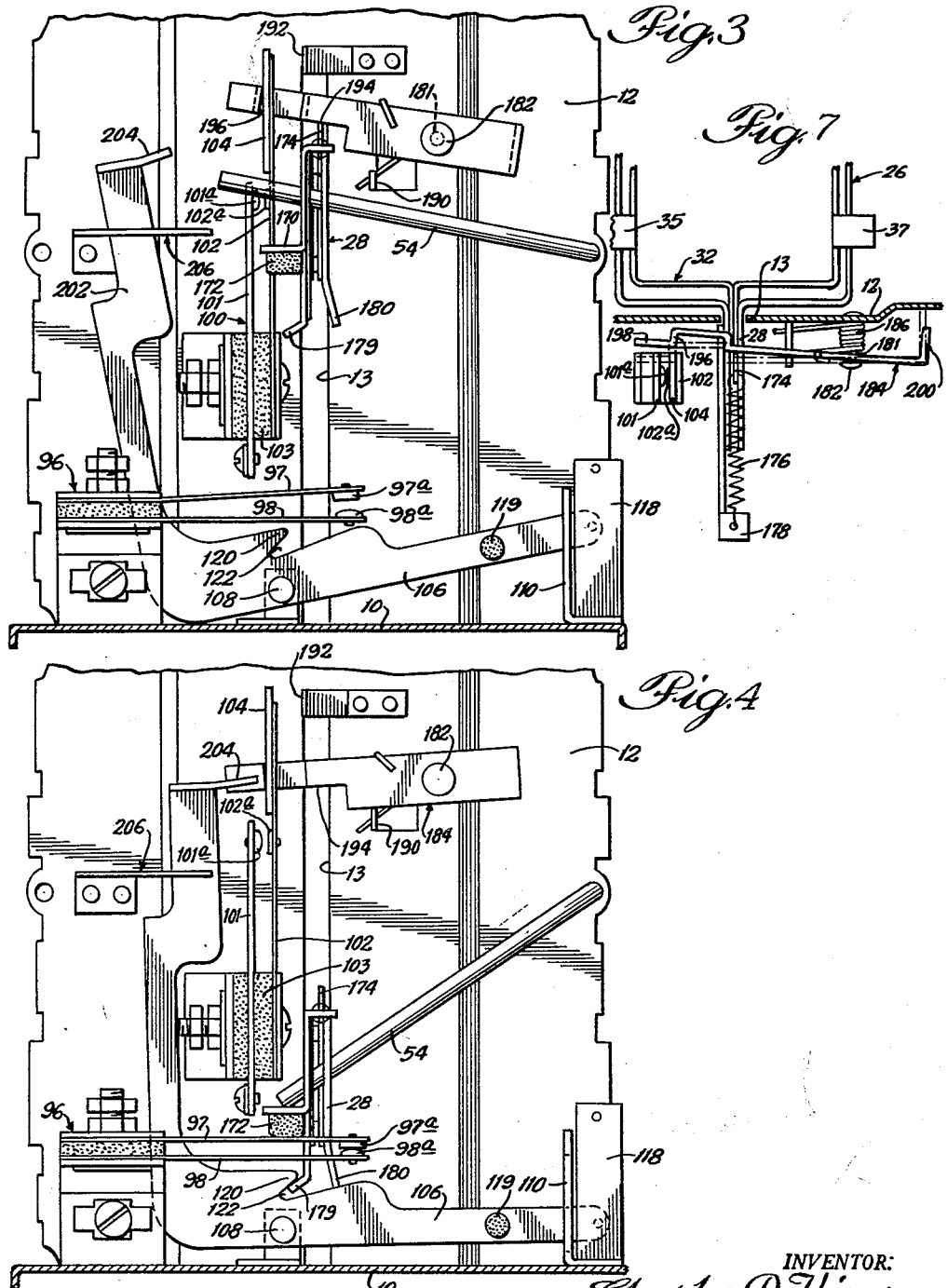

April 21, 1964        C. D. VISOS        3,129,651
AUTOMATIC TOASTER
Filed Dec. 6, 1960        3 Sheets-Sheet 3
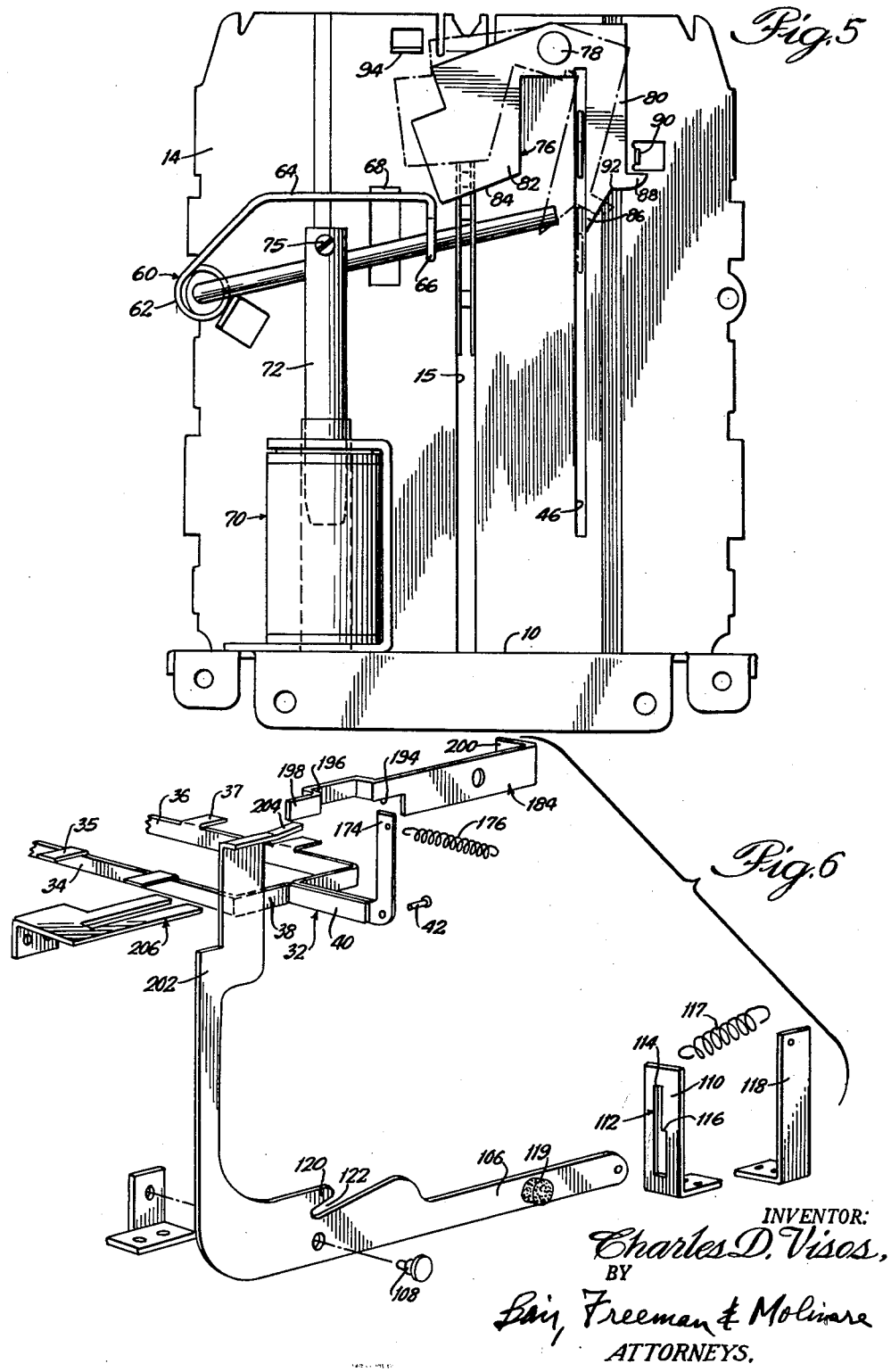

3,129,651
AUTOMATIC TOASTER
Charles D. Visos, St. Louis, Mo., assignor to Knapp-Monarch Company, St. Louis, Mo., a corporation of Delaware
Filed Dec. 6, 1960, Ser. No. 74,162
4 Claims. (Cl. 99—329)

This invention relates to an automatic toaster and more particularly relates to the apparatus for operating the bread carrier of an automatic toaster. The invention is especially directed to improvements in automatic toasters of the type wherein electromotive means are used to lower the bread carrier to toasting position, and spring means are used to raise the carrier to its starting position.

This application is a continuation-in-part of my copending application, Serial No. 59,931, filed October 3, 1960, and the invention disclosed herein is an improvement over the invention disclosed in said copending application.

In my said copending application the entry of a slice of bread into the toaster released a latch that maintained the bread carrier in elevated position, and then gravity carried the carriage to a lowered toasting position. After timing out of the toasting period, a solenoid was energized to effect raising of the bread carrier to its elevated position. Means were provided to prevent recycling which is always a problem where the carriage is returned to the raised position at substantial velocity.

In the instant invention the entry of a slice of bread into the toaster energizes a solenoid that pulls the bread carrier down to a toasting position while simultaneously potentializing a bread carrier restoring spring. Means are provided for latching the carrier in the toasting position while simultaneously deenergizing the solenoid. Then after the toasting cycle has been timed out, the latch is released permitting the potentialized spring to restore the carrier to its elevated position at substantial velocity, and means are provided to prevent recycling of the said mechanism.

The aforesaid improved bread carriage lowering and raising mechanism is further provided in combination with other improvements hereinafter described, such as, for example, a slide-type color control of the type disclosed in my copending application, Serial No. 842,760, filed September 28, 1959.

Prior to the present invention, automatic toasters had been proposed which employ a solenoid to first lower the toaster's bread carrier to a toasting position and a spring to raise it to the starting position. However, the use of a solenoid in previous constructions has been attended by difficulties in properly timing and correlating the functioning of the toaster parts. Consequently, there has been danger of burning out the solenoid or other elements, and heavy duty parts or additional structure have had to be employed.

It is especially desirable to provide an automatic toaster in which electromotive means, such as solenoid means, are employed to lower the bread carrier, as contrasted with the use of gravity as disclosed in my said copending application, Serial No. 59,931. One important reason for this preference is that if a toaster's solenoid fails to perform its mechanical function for any reason, it is better that the solenoid fails while lowering the bread carrier than while raising it. In the former case, the carrier will merely remain in its energized starting position, whereas in the latter case, the carrier will remain in the lower toasting position with the current continuing to flow to the toaster, so that overheating and damage may result.

It is, therefore, one object of the invention to provide a new and improved operating apparatus for automatic toasters which is effective and reliable, and particularly, to provide an improved operating apparatus which includes a solenoid means to lower the bread carrier.

A particularly important object is to provide improved operating apparatus for elevator type automatic toasters, including electromotive means to lower a bread carrier to toasting position and spring means to raise it to starting position.

Another important object is to provide a toasting apparatus in which improved latch and switch means cooperate to energize and de-energize the electromotive means for moving the bread carrier between the raised and lowered positions.

An additional object is to provide a simple, compact, and reliable operating apparatus for automatic toasters.

A more specific object of this invention is to provide an automatic toaster wherein the bread carrier is adapted to be latced both in the elevated position and the toasting position, and wherein means are provided responsive to insertion of a bread slice to unlatch the carrier from the elevated position and to move the carrier by an energized solenoid to the latched toasting position while simultaneously potentializing a restoring spring, and wherein timer means are provided for timing out the toasting cycle and to unlatch the carrier from the toasting position to permit the potentialized spring to restore the carrier to the latched elevated position, while preventing inadvertent recycling of the aforesaid mechanism.

Another more specific object of this invention is to provide an improved control circuit for a toaster's carrier mechanism in combination with a simple lever system which controls the said circuit in response to the position of the toaster's carrier.

These and other objects, advantages, and functions of the invention will be apparent on reference to the specification and to the accompanying drawings, in which like parts are identified by like reference characters in each of the views, and in which:

FIGURE 3 is a front end elevational view of the toaster of FIGURE 1 with certain parts omitted for purposes of clarity of view, and illustrating the bread carrier operating apparatus in the raised position after toasting and before removal of the toast;

FIGURE 4 is a view similar to FIGURE 3, but illustrating the parts when the bread carrier is in its lowered toasting position;

FIGURE 5 is a rear end elevational view of the toaster, illustrating in full lines the parts in the raised starting position of the bread carried, and illustrating in dot-dash lines how the mechanism prevents recycling;

FIGURE 6 is an exploded perspective view of certain portions of the bread-carrier's latch means that are illustrated in the preceding views; and FIGURE 7 is an enlarged fragmentary plan view of the cooperating portions of the bread-responsive means and the latch lever.

Figures 1, 2:
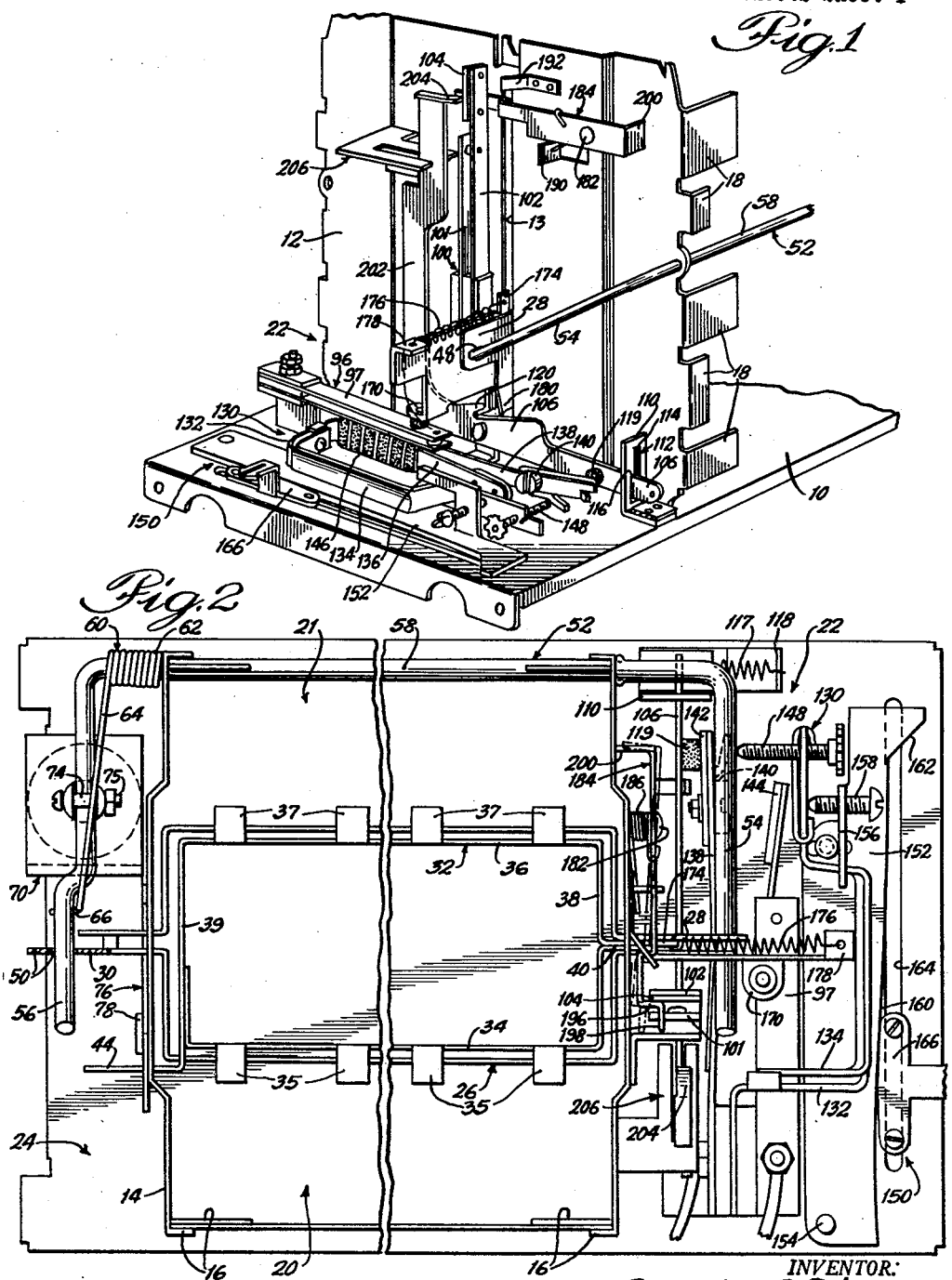
FIGURE 1 is an interior, fragmentary perspective view of the front end of an automatic toaster, with the outer casing removed, illustrating part of the operating apparatus of this invention, and showing the carriage in toasting position.
FIGURE 2 is a fragmentary top plan view of the toaster and the operating apparatus therefor in unloaded condition.

Before proceeding with a detailed description of the device herein disclosed it should be noted that, basically, this toaster is an automatic-carrier type toaster having a bread carriage which is normally maintained in its up position by a potentialized restoring spring, and means are provided which operate, upon insertion of a bread slice into the toaster, to energize a solenoid which draws the carriage down to a toasting position while further potentializing the restoring spring. When the carriage reaches the toasting position, latch means are provided for restraining the carriage in said toasting position and solenoid cut-out means are provided for substantially simultaneously de-energizing the solenoid means, so that the carriage is only mechanically held in the lowered toasting position. Movement of the carriage into the toasting position initiates energization of a toasting means, and initiates operation of a timer mechanism. When the toasting period has been timed out, the latch means is released and the potentialized spring moves the carriage to the up position, simultaneously de-energizing the toasting means. The carriage moves upward with substantial velocity, and a mechanical lock-out mechanism is provided to prevent recycling of the toaster until the finished toast has been removed. Thereafter, insertion of a fresh bread slice into the toaster starts the cycle again.

Referring now to the drawings, there is shown in FIGURES 1 and 2 a portion of the fully automatic toaster of this invention, with the outer casing of the toaster removed so as to disclose the parts therein. The interior structure illustrated includes frame means comprising a base 10, a front upright end panel 12, a rear upright end panel 14, and spaced side flanges 16 and 18 extending from the end panels 12 and 14 and adapted to position side panels therein. The front end panel 12 is provided with a central vertical slot 13 through which a front-control portion of the toaster's bread carriage is adapted to extend. The rear end panel 14 is provided with a central vertical slot 15, as best seen in FIGURES 3–5, through which a rear-control portion of the bread carriage is to extend.

The upright panels 12, 14, 16 and 18 surround a toasting space which is divided into two toasting chambers, generally indicated at 20 and 21. The space 22 forwardly of the upright end panel 12 constitutes a forward control space in which certain of the controls of the automatic mechanism are located, and the space 24 rearwardly of the rear end panel 14 defines a smaller, rear control space within which certain portions of the control mechanism are located.

Positioned within the toasting chambers 20 and 21 are portions of a bread carrier, or carriage, generally indicated at 26. The bread carrier 26 is defined by a pair of oppositely facing, generally U-shaped, members having lateral extensions, at the ends of the arms of the U, which are connected together in spaced relation to define the forward control portion, or extension, 28 which extends through slot 13 on end panel 12, and the rearward control portion, or extension, 30 which extends through slot 15 in panel 14.

There is also provided a pivotally-mounted, bread-responsive lever means 32 positioned generally above the carriage 26. The lever means 32 includes a pair of parallel bars 34 and 36 which extend generally parallel of the bights of the U-shaped members of the bread carrier 26 and which provide thereon lateral bread-engaging-and-supporting flanges 35 and 37. The parallel bars 34 and 36 are interconnected by cross portions 38 and 39. There is defined on the lever means 32 an axial forward extension 40 which projects between the spaced flanges on the U-shaped parts of the bread carrier 26, thereby extending centrally of the forward extension 28. A pivot pin 42 carried by the forward extension 28 of the bread carriage serves as the pivot mounting for the lever means 32. The lever means 32 also defines a rearward extension 44 which is offset from the longitudinal axis of the lever means 32 and which extends through a vertical slot 46 defined in the rear end panel 14.

A part of the forward extension 28 of the bread carrier 26 is apertured at 48 forwardly of pin 42. The rearward extension 30 has a portion which is apertured at 50. There is provided a generally U-shaped elevator bar, generally indicated at 52, which defines a pair of spaced arms 54 and 56 that are positioned outwardly of the end panels 12 and 14 and which are of a length and dimension to extend through apertures 48 and 50 defined in the extension portions 28 and 30 of the bread carrier 26. The apertures 48 and 50 are of sufficient size relative to the dimension of the arms 54 and 56 so that there is no binding as the carriage moves between its various positions. The U-shaped bar 52 defines an elongated bight 58 which is pivoted in the end panels 12 and 14, as illustrated in FIGURES 1–5.

The arm 56 is spaced from rear end panel 14 a predetermined distance, and a potentialized coil spring 60 is provided for normally biasing the elevator bar 52, and thereby carriage 26, toward the up position. The helical coil portion 62 of spring 60 is loosely mounted on the portion of bight 58 located between panel 14 and arm 56. An extended arm 64 of spring 60 extends in the direction toward slot 13 and is shaped to first slope upwardly from coil 62 and then extend laterally, as best seen in FIGURE 5, and to finally terminate in an upwardly opening hook 66 which engages the underside of arm 56. The end panel 14 carries a rearwardly extending stop flange 68 against which the arm 64 abuts when the carriage is in its normal raised position.

There is also positioned in the rear control space 24, upon the base 10, a solenoid coil generally indicated at 70, which is part of a solenoid motor that includes a vertically movable core, or plunger, 72 positioned generally below the arm 56. The plunger 72 is bifurcated at its upper end to provide a recess through which a portion of arm 56 may extend, and the ears of the bifurcated end of plunger 72 carry a nylon roller on a cross-pin 75 for effecting a smooth operative connection between the plunger 72 and the arm 56.

Mounted on the outer side of rear end panel 14 is a mechanism for preventing recycling of the toaster carriage. This mechanism is generally of the type described in the copending application, Serial No. 59,931, dated October 3, 1960. This mechanism includes an inverted, irregularly U-shaped, cam 76 that is pivotally mounted by its bight on a pin 78. The cam 76 provides one arm 80 that is positioned adjacent slot 46, and the other arm 82 extends generally trangsversely of, but adjacent slot 15. The arm 82 is of greater mass than arm 80 so that the U-shaped cam is normally biased by gravity to the position shown in FIGURE 5. The arm 82 provides an inclined edge 84 which projects across slot 15. The arm 80 is shaped to define a downwardly extending finger 86 extending parallel to slot 46 and a laterally extending finger 88. A stop flange 90 is bent from panel 14 and projects outwardly therefrom spaced from slot 46 and against which the arm 80 abuts. The fingers 86 and 88 define a crotch 92 therebetween adapted to receive the extended end 44 of lever means 32 when the cam 76 is swung to the dot-dash line position of FIGURE 5. The panel 14 provides a rearwardly extending stop flange 94 which is positioned to engage arm 82 of cam 76 when the cam is pivoted by the upward movement of the carriage 26.

Turning now to the control parts which are located in the front control space 22 located forwardly of end panel 12, the toaster is provided with an energizing circuit that includes a normally open main switch 96 for controlling energization of the toaster's heating elements. The blades of the main switch 96 are elongated, generally horizontally extending, flexible metal blades 97 and 98 that are separated by an insulator 99. The blades 97 and 98 respectively carry normally open contact points 97a and 98a.

As best seen in FIGURES 3 and 4, a second control switch is provided, generally indicated at 100, and includes a pair of substantially vertically disposed switch blades 101 and 102 separated by an insulator 103. The blades 101 and 102 respectively carry the contact points 101a and 102a. Blade 101 is relatively rigid, while blade 102 is relatively flexible and is of a greater length than blade 101, so as to extend above blade 101, as illustrated in FIGURES 3 and 4. The extended end of blade 102 carries an insulator 104 which is positioned to be engaged by switch-controlling elements hereinafter described. The flexible blade 102 has a spring bias in it which normally tends to bias the contact point 102a against contact point 101a to close the switch 100. The switch 100 is for the purpose of controlling energization of solenoid coil 70.

There is provided a timer mechanism and a latch lever mechanism of the type as also described and disclosed in the said copending application, Serial No. 59,931, dated October 3, 1960. The latch lever mechanism includes a pivotable arm 106 mounted for pivoting about the horizontal axis of laterally extending pin 108 carried by the frame. The distal end of arm 106 extends through a labyrinth, or positioning plate, 110 that is cut out to form an irregular aperture, or labyrinth, generally indicated at 112 which cooperates with the arm 106 to define a pair of positions for the arm 106. The labyrinth includes an upper edge 114 against which the arm 106 rests in one position, and a lower edge 116 against which the arm 106 rests in a second position. The extended end of arm 106 is connected by an inclined spring 117 to an anchor flange 118 that is mounted upon base 10, and which is of a length such that the spring 117 is normally inclined upwardly from its connection to arm 106, thereby normally biasing the arm 106 both in a direction away from panel 12 and in a direction upwardly against the edges 114 or 116.

The arm 106 carries an anvil 119 of insulating material that is positioned between the labyrinth plate 110 and the pivot pin 108. The arm 106 is shaped to define a laterally extending tongue 120 which overlies a recess 122 that is located adjacent, but slightly offset from, slot 13 in panel 12, for a reason appearing hereinafter. The axis of pin 108 is located laterally of slot 13, so that the recess 122 is located between the axis of pin 108 and slot 13.

The timer mechanism, generally indicated at 130, is of the type generally disclosed in Patent No. 2,778,902. The timer 130 includes a spring blade arm 132, which carries a formed arm 134 of relatively rigid material, and which is spaced from bimetal arm 136 which, in turn, is normally spaced from a potentializable leaf spring arm 138 that carries a magnet 140. The extended end of arm 138 carries an impact abutment 142 adapted to strike against anvil 119 carried by arm 106. The bimetal arm 136 carries a magnet keeper 144 for cooperation with magnet 140. A heating wire 146 is wrapped around a portion of bimetal arm 136 for purposes as explained in the said Patent No. 2,778,902. The arm 134 carries an adjustable abutment screw 148 positioned to be engaged by the extended end of arm 136.

The toaster is also provided with a slide-type color control and carriage release, generally indicated at 150, of the type disclosed in my copending application, Serial No. 842,760, filed September 28, 1959. The color control includes an elongated arm 152 that is pivotally mounted on pin 154 carried on the base 10 of the toaster. The arm 152 has an upright flange 156 which carries an adjustment screw 158 for cooperation with arm 134. The arm 152 is provided with a curved cam edge 160 and another cam edge 162 extending sharply relative to edge 160. The toaster frame is provided with a track slot 164 in which an actuator 166 may move in cooperation with the cam edge 160. The spring blade 132 operates through arm 134, screw 158, and flange 156 to bias arm 152 against actuator 166. The operation of the color control and release are as described in the said copending application, Serial No. 842,760, and it will be understood that as actuator 166 is moved along track slot 164 in engagement with cam edge 160, it varies the position of the abutment screw 148 carried by arm 152 relative to arm 136. This varies the period of the timing means 130 and thereby controls the color of the toast produced. The actuator 166 moving against cam edge 162 operates to move arm 136 against anvil 119 to effect manual termination of the toasting cycle.

The forward extension 28 carries thereon a depending foot 170, with an insulator button 172 adapted to engage and depress the upper blade 97 of switch 96. The bread-responsive lever means 32 is provided with an upwardly extending flange 174 which extends above the upper edge of the forward extension 28 and which is connected by means of elongated coil spring 176 to a laterally extending flange 178 formed on forward extension portion 28. The portion 28 is also shaped to define a depending and laterally inclined latch foot 179 and a depressing foot 180. The foot 180 serves to engage and depress arm 106 when carriage 26 descends, at the same time the foot 179 enters recess 122 with tongue 120 above and engaging foot 179 to maintain carriage 26 in the lowered position.

Positioned on front end panel 12 is a pin 181 extending forwardly thereof and provided with an enlarged head 182. A latch lever 184 is pivotally and wobbly mounted on pin 181 in engagement with head 182. A coil spring 186 is mounted on pin 181, with one end anchored to panel 12 and the other end engaging the upper edge of latch lever 184 to normally bias the latch lever 184 counterclockwise when viewed in FIGURES 3 and 4. The coils of the coil spring 186 also permit of movement of the latch lever 184 axially of pin 181. A pair of spaced stops 190 and 192 provide limits for the pivoting of latch lever 184 under the bias of spring 186. The latch lever has one end which projects across the path of movement of the bread carriage 26 and defines an abutment shoulder 194 which is adapted to be engaged by the terminus of flange 174 on lever means 32 when the carriage rises to the up position after a toasting operation. A portion of latch lever 184 extends beyond slot 13 and is shaped to define a laterally extending shoulder 196 which is adapted for engagement and cooperation with the insulator 104 on leaf spring blade 102. A further extension 198 of latch lever 184 provides an abutment adapted to engage the edge of insulator 104. The opposite end of latch lever 184 is inwardly turned at 200 to provide a limit for movement of latch lever 184 axially of pin 180.

The arm 106 is angle-shaped to provide an upwardly extending portion 202 which carries an abutment tongue 204 that is positioned to cooperate with switch blade 102 of the second control switch 100. A bifurcated guide 206 mounted on end panel 12 provides a guide for restraining the upwardly extended portion 202 of arm 106 against displacement relative to panel 12. Alternative to fixed tongue 204, the arm portion may be provided with a flange having a threaded aperture in which is positioned an elongated threaded screw or bolt, thereby providing a range of adjustment for selecting the precise position of arm 106 at which the screw is to engage blade 102 to open switch 100.

*Operation*

In the operation of the toaster, the majority of the parts, except as hereinafter noted, are normally in the position shown in FIGURES 3 and 5 in full lines when the toaster is awaiting entry of a slice of bread. Upon entry of a slice of bread into toasting chamber 20 or 21, the engagement of the lower edge of the bread slice with flanges 35 or 37 of lever means 32 will pivot the lever means about pin 42 from its normally upwardly inclined position down to a substantially horizontal position in the plane of the bread carrier 26. The lever means 32, when unloaded, are normally pivoted to an inclined position by means of spring 176.

As the lever means 32 pivots downwardly, the flange 174 engages the outer side of latch lever 184, as best seen in full lines in FIGURE 2, and moves the latch lever to the dot-dash line position of FIGURE 2. When this occurs, the shoulder 196 is withdrawn from engagement with insulator 104 on spring blade 102, thereby permitting the inherent resilience of blade 102 to close switch 100 to energize solenoid coil 170. The lateral movement of blade 102 moves the edge of blade 102 into alignment with extension 198 of latch lever 184, and in that position the latch lever 184 is maintained in the dot-dash position of FIGURE 2.

With solenoid 70 energized, the plunger 72 is drawn downward sharply and this operates through pivoted bar 52 to lower the carriage 26 to a toasting position and to further potentialize the restoring spring 60. As the carriage moves down to the toasting position the foot 180 engages the arm 106 and pivots it clockwise about the axis of pin 108, as viewed in FIGURES 3 and 4, thereby swinging the tongue 120 to a position overlying the foot 179 that enters recess 122 in arm 106. At the same time, the extended end of arm 106 is moved into the lower portion of labyrinth 112 and spring 117 biases arm 106 to wobble around pin 108 to a latch position where the upper edge of arm 106 engages edge 116 of the labyrinth. As the carriage 26 moves down to the toasting position, the insulator 172 engages and depresses the blade 97 of switch 96 to close switch 96, as seen in FIGURE 4. The movement of arm 106 from the position of FIGURE 3 to the position of FIGURE 4 swings abutment tongue 204 into engagement with insulator 104 on leaf spring 102 and operates to displace leaf spring 102 to a position where the shoulder 196 on latch lever 184 may again interpose itself to prevent closure of switch 100.

Thus, at the same time that the carriage has been moved to the lowered toasting position, latch means are applied which maintains the carriage lowered, the main switch 96 which energizes the heating elements of the toaster has been closed, and the switch which energizes the lowering solenoid coil 70 has been opened to prevent burn-out of the solenoid. The toasting operation is then timed by operation of the timer mechanism. This includes warping of the bimetal blade 136, by heating of coil 146, toward blade 138 until the magnet keeper 144 is sufficiently close to magnet 140 to cause the two to engage, whereupon the heating of coil 146 is shunted to permit the bimetal 136 to cool and flex in the opposite direction to potentialize blade 138, and wherein the extended end of blade 138 engages abutment 148, and the further cooling and flexing of bimetal 136 eventually causes the separation of magnet keeper 144 from magnet 140, whereupon the potentialized arm 138 swings against anvil 119 to move the arm 106 away from engagement with edge 116, whereupon spring 117 pulls arm 106 upwardly against edge 114 and releases the carriage, so that the potentialized spring 60 moves the carriage with toasted bread thereon upwardly at substantial velocity to the up position.

The upward movement of spring 60 is limited by stop 68, but the carriage 26 is free to continue to rise, and the control portion 30 of the carriage engages the cam edge 84 of cam 76, which swings the crotch 92 on arm 80 across slot 46 and thereby intercepts and prevents upward movement of extension 44 of the bread-responsive lever means 32. When the carriage settles back under gravity to being supported through arm 56 resting in hook 66 of spring 60, the weighted arm 82 of cam 76 pivots cam 76 to the full-line position shown in FIGURE 5, with slot 46 unobstructed. Then, upon manual removal of the finished toast from the toaster, the bread-responsive means 32 is free to move upwardly to its normal inclined position, because the extension 44 is free to move upwardly through slot 46.

When the loaded carriage is in the up position and before the toast has been removed, then the upper edge of flange 174 engages the shoulder 194 on latch lever 184 and lifts the latch lever to the position shown in FIGURE 3. In this position, the shoulder 196 slides relative to insulator 104 and operates to maintain switch 100 in open condition. When the bread is removed from the toaster, the spring 176 pulls the flange 174 in the direction away from panel 12 to a position where it no longer engages shoulder 194 on latch lever 184. This permits the spring 186 to swing latch lever 184 counterclockwise, as viewed in FIGURE 3, to the position as illustrated in full lines in FIGURE 2, with lever 184 located laterally between flange 174 and panel 12 and with the parts of the toaster reset in a position awaiting beginning of a new cycle.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. A toaster comprising, in combination: a bread carrier movable between a raised non-toasting position and a lowered toasting position; first means for normally holding the bread carrier in raised position; second means for holding the carrier in lowered position; electromotive means for moving said bread carrier from raised position to lowered position; said first means including potentialized spring means urging the carrier from lowered position toward raised position; an energizing circuit for said electromotive means, said circuit having therein a control switch which is normally urged toward a closed position; latch means for maintaining said control switch open when either said first or second means is operative to maintain the carrier in one of the carrier's said positions; lever means responsive to entry of a bread slice into the toaster to release said latch means and to permit the control switch to close so as to energize the electromotive means to move the carrier to the lowered position and to further potentialize said spring means; means responsive to arrival of the bread carrier in lowered position for opening said control switch to de-energize the electromotive means; timing means for timing out a preselected toasting period; and means movable in response to upward movement of said carrier toward raised position and before the carrier reaches the raised position to prevent recycling of the toaster.

2. A toaster comprising, in combination: a bread carrier movable between a raised, non-toasting, position and a lowered, toasting, position; first means for normally holding the bread carrier in raised position; second means for holding the carrier in lowered position; electromotive means for moving said bread carrier from raised position to lowered position; said first means including potentialized spring means urging the carrier from lowered position toward raised position; an energizing circuit for said electromotive means, said circuit having therein a control switch which is normally urged toward a closed position; latch means for maintaining said control switch open when either said first or second means is operative to maintain the carrier in one of the carrier's said positions; and said first means comprising a pivotally mounted elongated lever arm having a portion thereof, distal from the pivot axis of said lever, slidably engaging a portion of the bread carrier, the potentialized spring means engaging said lever arm to bias the carrier toward raised position, and the electromotive means including a solenoid plunger directly engaging the lever arm and providing a sliding connection thereat between the pivot axis of the lever arm and the portion of the lever arm that slidably engages the bread carrier.

3. A toaster comprising, in combination: a bread carrier movable between a raised, non-toasting, position and a lowered, toasting position; first means for normally holding the bread carrier in raised position; second means for holding the carrier in lowered position; electromotive means for moving said bread carrier from raised position to lowered position; said first means including potentialized spring means urging the carrier from lowered position toward raised position; an energizing circuit for said electromotive means, said circuit having therein a control switch which is normally urged toward a closed position; latch means for maintaining said control switch open when either said first or second means is operative to maintain the carrier in one of the carrier's said positions; lever means responsive to entry of a bread slice into the toaster to release the latch means and to permit the control switch to close so as to energize the electromotive means to move the carrier to the lowered position and to further potentialize said spring means; means responsive to arrival of the bread carrier in lowered position for opening said control switch to deenergize the electromotive means; release means for releasing said second means at the end of a bread toasting period to permit the potentialized spring to return the carrier at substantial velocity toward its raised position, the movement of the carriage with bread loaded thereon, at substantial velocity toward raised position, having the tendency to effect recycling of the carriage movements; and a pivotable cam positioned to be engaged by the bread carrier as the carrier moves toward raised position to temporarily swing a barrier across the path of movement of the lever means to maintain the lever means substantially in the position that it would normally occupy when loaded with a slice of bread, thereby preventing any movement of the lever means that may initiate recycling of the bread carrier's movements.

4. A toaster comprising, in combination: a bread carrier movable between a raised, non-toasting, position and a lowered, toasting position; first means for normally holding the bread carrier in raised position; second means for holding the carrier in lowered position; electromotive means for moving said bread carrier from raised position to lowered position; said first means including potentialized spring means urging the carrier from lowered position toward raised position; an energizing circuit for said electromotive means, said circuit having therein a control switch which is normally urged toward a closed position; latch means for maintaining said control switch open when either said first or second means is operative to maintain the carrier in one of the carrier's said positions; lever means responsive to entry of a bread slice into the toaster to release the latch means and to permit the control switch to close so as to energize the electromotive means to move the carrier to the lowered position and to further potentialize said spring means; means responsive to arrival of the bread carrier in lowered position for opening said control switch to deenergize the electromotive means; release means for releasing said second means at the end of a bread toasting period to permit the potentialized spring to return the carrier at substantial velocity toward its raised position, the movement of the carriage with bread loaded thereon, at substantial velocity toward raised position, having the tendency to effect recycling of the carriage movements; and a pivotable cam positioned to be engaged by the bread carrier as the carrier moves toward raised position to temporarily swing a barrier across the path of movement of the lever means to maintain the lever means substantially in the position that it would normally occupy when loaded with a slice of bread, thereby preventing any movement of the lever means that may initiate recycling of the bread carrier's movements; said pivotable cam being normally in a position where the barrier is out of the path of movement of the lever means, and said cam pivoting to its normal position after upward movement of the bread carrier has terminated.

References Cited in the file of this patent
UNITED STATES PATENTS

| | | |
|---|---|---|
| 2,288,713 | Ireland | July 7, 1942 |
| 2,693,142 | Ireland | Nov. 2, 1954 |
| 2,773,441 | Ireland | Dec. 11, 1956 |
| 2,863,377 | Huck | Dec. 9, 1958 |
| 2,877,702 | Turner | Mar. 17, 1959 |
| 2,890,645 | Bergsma | June 16, 1959 |